United States Patent
Mattox, Jr. et al.

(10) Patent No.: US 8,924,344 B2
(45) Date of Patent: Dec. 30, 2014

(54) USER PROFILE REPLICATION

(75) Inventors: Gregory T. Mattox, Jr., Bellevue, WA (US); Shane Michael DeSeranno, Snohomish, WA (US); Bryant Fong, Kirkland, WA (US); Jad Honein, Redmond, WA (US); Sudhir Kesavannair Rajeswari, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 773 days.

(21) Appl. No.: 12/163,078

(22) Filed: Jun. 27, 2008

(65) Prior Publication Data

US 2009/0138525 A1    May 28, 2009

Related U.S. Application Data

(60) Provisional application No. 60/990,690, filed on Nov. 28, 2007.

(51) Int. Cl.
   *G06F 17/00* (2006.01)
   *G06F 7/00* (2006.01)
   *G06F 17/30* (2006.01)

(52) U.S. Cl.
   CPC ............... *G06F 17/30575* (2013.01)
   USPC .......................................... 707/610; 707/625

(58) Field of Classification Search
   None
   See application file for complete search history.

(56) References Cited

U.S. PATENT DOCUMENTS

| | | | |
|---|---|---|---|
| 6,167,408 A * | 12/2000 | Cannon et al. ..................... 1/1 |
| 6,446,048 B1 | 9/2002 | Wells |
| 6,542,515 B1 * | 4/2003 | Kumar et al. ................. 370/463 |
| 7,076,504 B1 | 7/2006 | Handel |
| 7,175,078 B2 | 2/2007 | Ban |
| 7,266,595 B1 | 9/2007 | Black |
| 8,775,374 B2 * | 7/2014 | Araki et al. .................. 707/621 |
| 2003/0065558 A1 | 4/2003 | Shaw |
| 2003/0145003 A1 * | 7/2003 | Yellepeddy et al. ............. 707/6 |
| 2003/0149758 A1 * | 8/2003 | Riche et al. .................. 709/223 |
| 2006/0031529 A1 | 2/2006 | Keith |
| 2006/0080415 A1 | 4/2006 | Tu |

(Continued)

OTHER PUBLICATIONS

Riche et al.; "Client-Side Profile Storage: a Means to Put the User in Control"; http://www.hpl.hp.com.techreports/2001/HPl-2001-291.pdf; (2001) 26 pages.

(Continued)

*Primary Examiner* — Rehana Perveen
*Assistant Examiner* — Raheem Hoffler
(74) *Attorney, Agent, or Firm* — Tom Wong; Jim Ross; Micky Minhas

(57) ABSTRACT

User profile replication may be provided. First, at least one modification to at least one user profile property may be received at a first service provider. A user profile change log may be updated in response to receiving the at least one modification to the at least one user profile property. Then the at least one modification to the at least one user profile property may be identified at the first service provider. Identifying the at least one modification to the at least one user profile property at the first service provider may comprise retrieving the at least one modification to the at least one user profile property from the user profile change log. Next, the identified at least one modification to the at least one user profile property may be replicated at a second service provider. The first service provider and the second service provider may be geographically separate.

20 Claims, 5 Drawing Sheets

(56) References Cited

U.S. PATENT DOCUMENTS

| | | | |
|---|---|---|---|
| 2006/0167863 A1* | 7/2006 | Cole et al. | 707/3 |
| 2006/0171523 A1* | 8/2006 | Greenwell | 379/242 |
| 2006/0256734 A1* | 11/2006 | Erhart et al. | 370/254 |
| 2007/0244930 A1* | 10/2007 | Bartlette et al. | 707/104.1 |
| 2014/0143765 A1* | 5/2014 | Harley et al. | 717/168 |

OTHER PUBLICATIONS

Shropshire; "User Profiles—Why do my Changes not Show in Other Sites?—a detailed understanding of How the Sync Works"; http://www.21apps.com/2008/02/user-profiles-why-do-my-changes-not.html; (Feb. 13, 2008); 10 pages.

Pattison; "New Dev-Centric Features In Office SharePoint Server Keep Your Apps Rolling"; http://msdn2.microsoft.com/en-us/magazine/cc163560.aspx; (2006); 19 pages.

Gao et al,; "Improving Availability and Performance with Application-Specific Data Replication"; http://ieeexplore.ieee.org/ie15/69/29880/01363768.pdf?arnumber=1363768; vol. 17, No. 1 (Jan. 2005) 15 pages.

Minh; "User Profile Replication with Caching for Distributed Location Management in Mobile Communication Networks"; http://delivery.acm.org/10.1145/380000/372377/p381-minh.pdf?key1=372377&-key2=6215056021&coll=Guide&dl=GUIDE&CFID=1390336&CFTOKEN=63326814; (2001); 6 pages.

* cited by examiner

USER PROFILE REPLICATION

RELATED APPLICATION

Under provisions of 35 U.S.C. §119(e), the Applicants claim the benefit of U.S. provisional application No. 60/990,690, filed Nov. 28, 2007, which is incorporated herein by reference.

BACKGROUND

Conventional service provider servers are designed with the idea that an entity such as a company will have a single server from which all of its sites will consume enterprise level services. Along with this assumption came a (technology bound) rule stating that a site or portal can only consume services from one and only one service provider. For most services, this concept works well for hosted scenarios & non global organizations/companies or completely silo-ed organizations.

However there are limitations for services that rely on data provided by a user profile service such as search, audiences, and sites. The root of the issue lays in a fundamental principle of the user profile service, that a person (user) is the same person (user) no matter where they are in the organization, or which systems system they're using. In geographical deployment scenarios, service provider isolation becomes an issue for personalization and the associated services. These issues include, but are not limited to, inaccurate and inconsistent user profile data (including property, colleagues, memberships, links & privacy data); inaccurate audience memberships; and an incomplete and inaccurate people search data corpus and experience.

In geographical deployment scenarios, shared service provider (SSP) isolation becomes an issue for personalization and the associated services such as User Profiles, Audiences & (People) Search. These issues include, but are not limited to, inaccurate and inconsistent user profile data (including property, colleagues, memberships, links & privacy data); inaccurate audience memberships; and an incomplete and inaccurate people search data corpus and experience.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

User profile replication may be provided. First, at least one modification to at least one user profile property may be received at a first service provider. A user profile change log may be updated in response to receiving the at least one modification to the at least one user profile property. Then the at least one modification to the at least one user profile property may be identified at the first service provider. Identifying the at least one modification to the at least one user profile property at the first service provider may comprise retrieving the at least one modification to the at least one user profile property from the user profile change log. Next, the identified at least one modification to the at least one user profile property may be replicated at a second service provider. The first service provider and the second service provider may be geographically separate.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
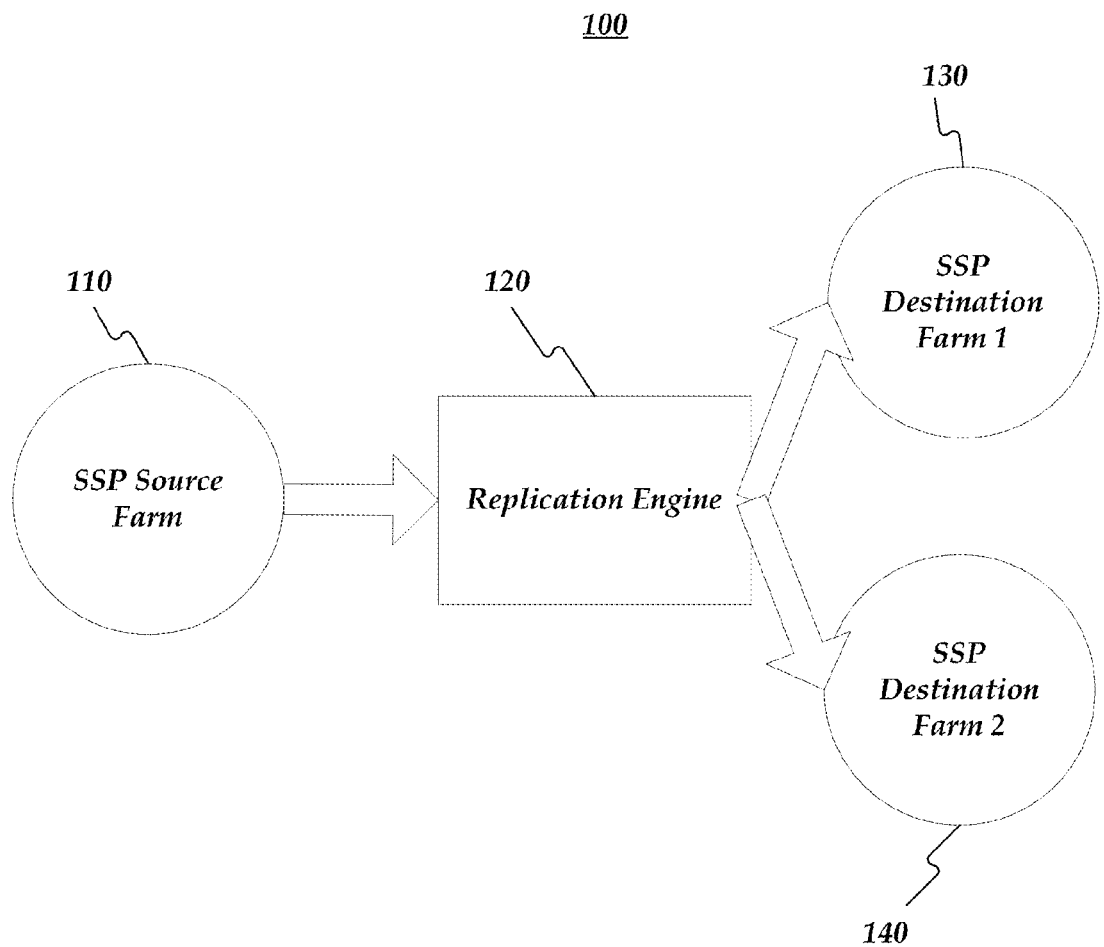
FIG. 1 illustrates a system connecting shared service provider farms via a replication engine.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Embodiments of the present invention may be directed to a User Profile Replication Engine (RE) 120, as illustrated in FIG. 1, for breaking through the SSP isolation boundaries to store and maintain consistent user profile data throughout the complete environment, including geo deployments. RE 120 may perform multi-master data replication from one source to multiple destinations in the form of a full or incremental synchronization using web services.

The web services are used to pull the data (all profile data or just the changes) from a source shared service provider (SSP) and immediately push/write the data to other SSPs on behalf of the user or User Profile service. This data includes profile property data, user colleague data, site membership data, user links data & the associated privacy policy attached to the data. RE 120 may synchronize data as a scheduled service or through manual initiation. For example, the RE may initiate a synchronization in response to a modification of a user's profile data at the source SSP. The RE may also initiate a synchronization at a predetermined time interval. Data may be pulled and pushed for all users or just a subset of users as well as all data or a subset of data. The data may be used to keep the User Profile, Audiences, & (People) Search services accurate and up to date.

Using this process, an organization may host the user's environment in the geographical region of the user (e.g., Europe), allowing the user to profile him or herself locally and have that data replicated to all other regions (e.g., Asia & Americas). This may allow services in those regions to use a local copy of that data for their services. Particular service consumption may needs a local copy for indexing. With this process an organization may host a search service (e.g., People Search) in the main region (Americas) while serving up data from all regions. This may create a seamless user experience including accurate social distance grouping. This same seamless user experience may also transfer to other services such as My Sites & Audiences.

This process may also be used to assist with centralized user profile data management, managing user data across a silo-ed organization, or as a deployment or test tool used to populate data from a production environment to a test/development or backup environment for data recovery.

According to embodiments of the present invention, RE (Replication Engine) 120 may be part of a process called "Feed Management" for Microsoft® Web Services. It may replicate profile data among shared service providers. Every instance of RE 120 may replicate profile data from one source farm SSP to multiple destination farm SSPs. RE 120 may execute from a machine that is not necessarily part of a farm. For example, FIG. 1 illustrates an example system 100 connecting an SSP source farm 110 to replication engine 120. Replication engine 120 may replicate profile data from SSP source farm 110 to a first SSP destination farm 130 and a second SSP destination farm 140. Consistent with embodiments of the present invention, replication engine 120 may also replicate data from either or both first SSP destination farm 130 and second SSP destination farm 140 to each other and to SSP source farm 110.

Figure 2:
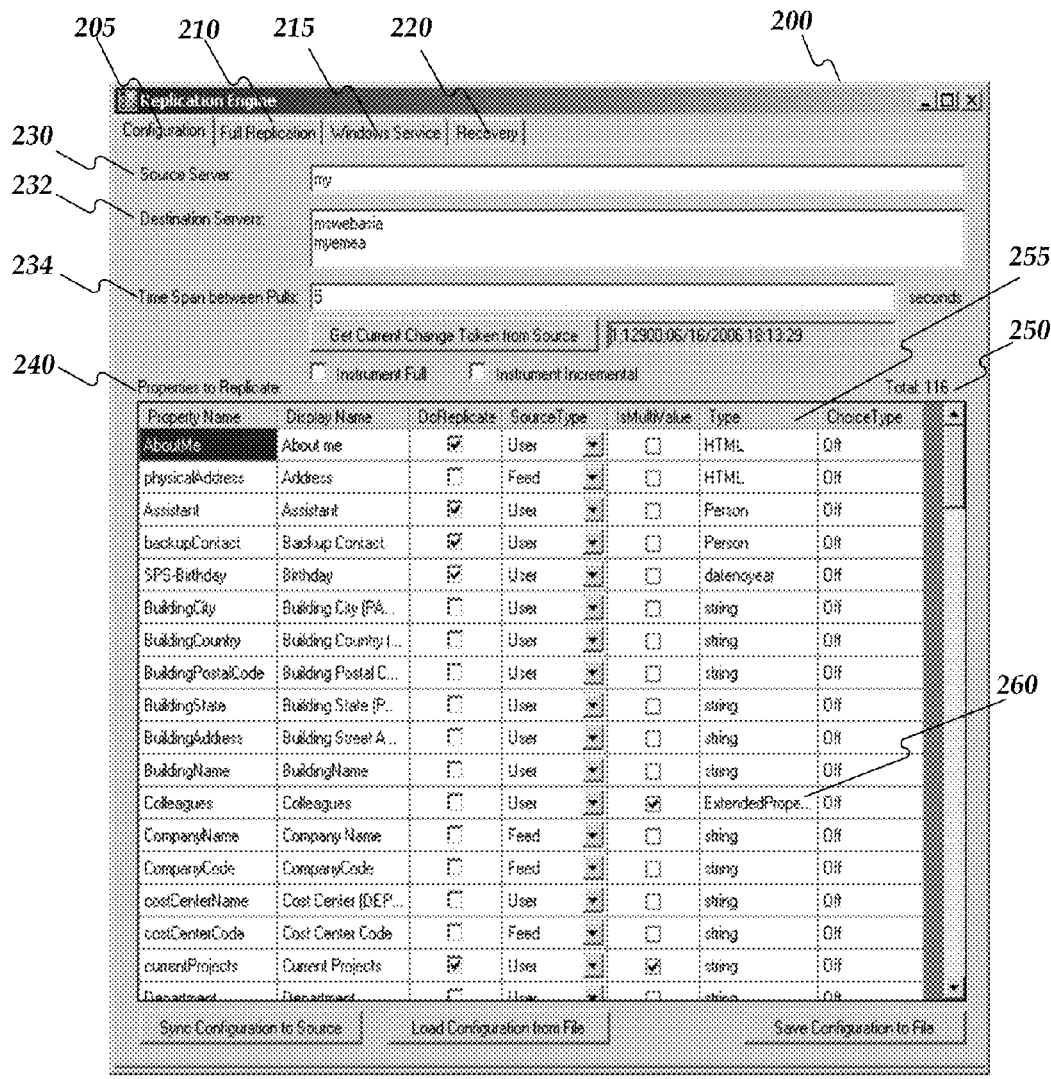
FIG. 2 illustrates a user interface for configuring the replication engine.

FIG. 2 illustrates a user interface 200 for configuring replication engine 120. User interface 200 may include a configuration tab 205, a full replication tab 210, a windows service tab 215, and a recovery tab 220. User interface 200 may store configuration data in an XML file. User interface 200 may include a source server entry field 230, a destination server entry field 232, and a time interval entry field 234. For example, a user may enter SSP source farm 110 in source server entry field 230, first SSP destination farm 130 and second SSP destination farm 140 in destination server entry field 232, and may enter 5 seconds as a time between updates in time interval entry field 234.

User interface 200 may also include a properties to replicate selection field 240. Properties to replicate selection field 240 may display a list of properties available for replication and allow a user to select properties that replication engine 120 may replicate. Properties may include feed and/or user properties, wherein feed properties are to be replicated to all destination servers and user properties may only be replicated if the associated user belongs to the source SSP selected in source server entry field 230. User interface 200 may also provide a user with additional functionality. For example, user interface 200 may provide a button and/or other selection control to load and/or save a configuration, load a list of properties from the source SSP selected in source server entry field 230, retrieve a current change token from the source SSP selected in source server entry field 230, and enable full or incremental replication. A total label 250 may display a total number of configurable properties. The total number may be less than the total number of properties associated with configuring replication engine 120 as the total may not reflect unconfigurable properties. Properties to replicate selection field 240 may also include a type column 255 which may enumerate a type for each property. Property types may include type ExtendedProperty 260, which may comprise colleagues, links, memberships, pinned links, and personalization sites.

Full replication tab 210 may allow configuration and initiation of full replication operations and may include start, stop, and/or resume controls. For example, full replication may be used during an initial farm setup and in case of a disaster recovery scenario. Full replication tab 210 may display a source server, a destination server, and a total number of profiles to be replicated. The total number of profiles may be used to estimate a time to complete. Full replication tab 210 may also allow a user to select a starting profile index to begin or resume a full replication process from a particular point. Full replication tab 210 may also display status information, such as a start time, estimated total time, time elapsed, estimated end time, estimated time remaining, a number of accounts processed total and rate per second, and a number of processor threads in use.

Replication may produce an error log file containing account names and/or profile indexes for those profiles wherein replication encountered an error. Errors may also be logged to an error file and/or an operating system log to provide greater detail. A full replication may also produce a unique log file for every instance of a run comprising a start time, an end time, and, for each replicated profile, a profile index, an account name, and a total time elapsed.

Windows service tab 215 may control replication engine 120 when replication engine 120 is running as a background process, such as a Windows® service. Access to the controls of windows service tab 215 may be restricted to users with permission to control replication engine 120. Windows service tab 215 may include a status display comprising the source SSP server, the destination SSP server, the current change token from the source SSP server, a processed change token from the destination SSP server, and a difference between the source and destination change tokens. Windows service tab 215 may also include start and stop controls for starting and stopping replication engine 120.

Recovery tab 220 may control a full serial replication using one thread. Replication tab 220 may display the source SSP server and the destination SSP server. These displays may be populated by the values from configuration tab 205. Consistent with exemplary embodiments, destination SSP server may be editable so that the user may select a different destination SSP server. Recovery tab may provide a browse control wherein the user may browse to a file comprising account names. The file may be generated by the incremental or full replication error logging; in this way user can point to this log file and reprocess all account names that included errors.

Figure 3:
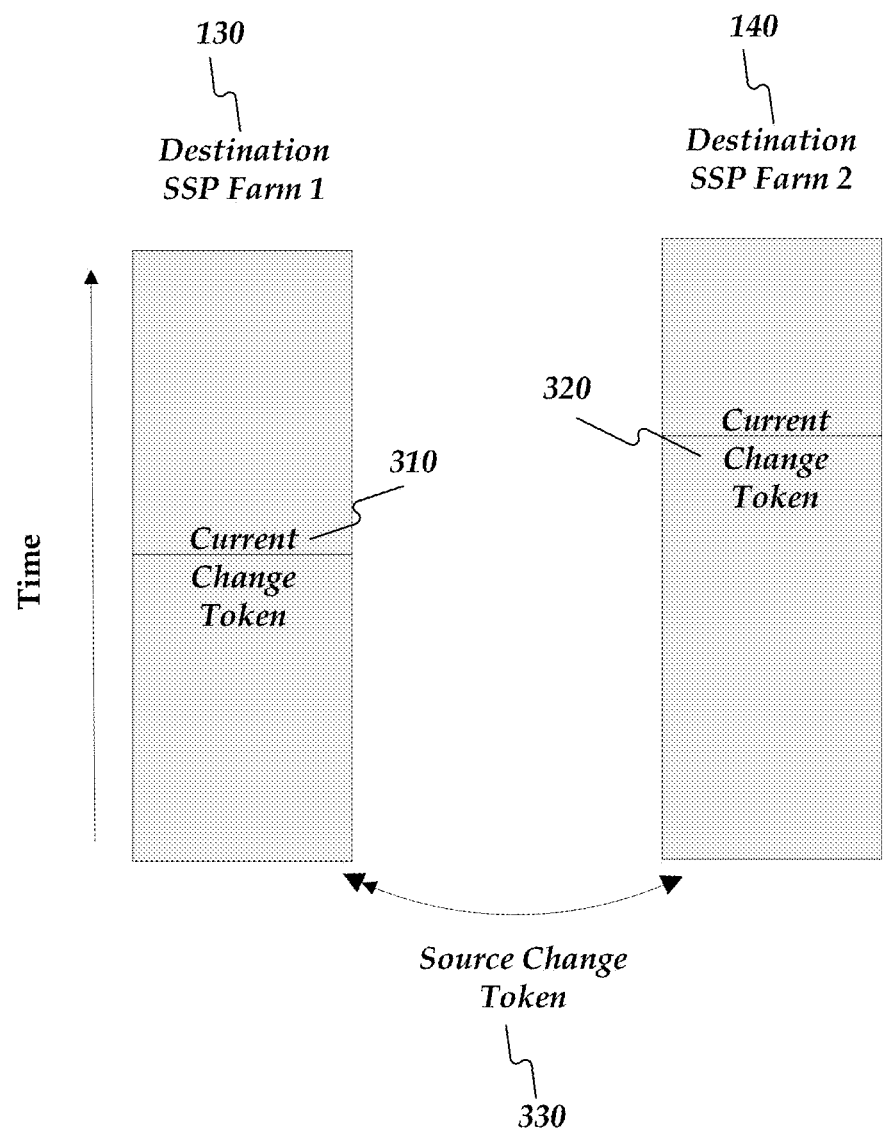
FIG. 3 illustrates change tokens at source and destination SSP servers.

An incremental instrumentation file may be created for each destination SSP server. The incremental instrumentation file may be appended by a unique identifier that reflects the instance of a run. An example incremental instrumentation file may be as follows:

ChangeToken: 1;15415863;10/24/2006 17:14:59
ChangeType: Metadata
EventTime: 10/24/2006 5:14:59 PM
Id: 15415862
ObjectType: MultiValueProperty
PropertyName: languageFluencies
UserAccountName: REDMOND\jadhon
UserRemotePersonalSiteHostUrl: null
Value: null
ChangeToken: 1;15415863;10/24/2006 17:14:59
ChangeType: Add
EventTime: 10/24/2006 5:14:59 PM
Id: 15415863
ObjectType: MultiValueProperty
PropertyName: languageFluencies
UserAccountName: REDMOND\jadhon
UserRemotePersonalSiteHostUrl: null
Value: Abkhazian FIG. 3 illustrates change tokens at source and destination SSP servers for use with an incremental replication. Incremental replication may be performed by replication engine 120. Replication engine 120 may create token text files in the name of each destination SSP server (i.e. destinationServer-Name.txt) to store the current change token that is being processed. The change token file of each destination may be updated only on successes. Change tokens may be logged into error and instrumentation files. This may give control for administrators to initiate the incremental replication from any token by updating the change token file then turning on replication engine 120. If the destination server name contains a port number, then the token file may be the name appended with the port number without the colon since a filename may not be able to contain colons. For example, first destination SSP farm 130 may be named "servername" and may be accessed on port 8888. A first current change token 310 may be stored in a file named servername8888.txt. Second destination SSP farm 140 may be named "otherserver" and may be accessed on port 8230 so that a second current change token 320 may be stored in a file names otherserver8230.txt. The first current change token 310 and second current change token 320 may each be accessed and compared to a source change token 330 stored at source SSP farm 110. Source change token 330 may be updated each time a user profile at source SSP farm 110 is changed. The difference between source change token 330 and, for example, first current change token 310, may thus represent the time span for which changes need to be replicated from source SSP farm 110 to first destination SSP farm 120 when an incremental replication is initiated.

Figure 4:
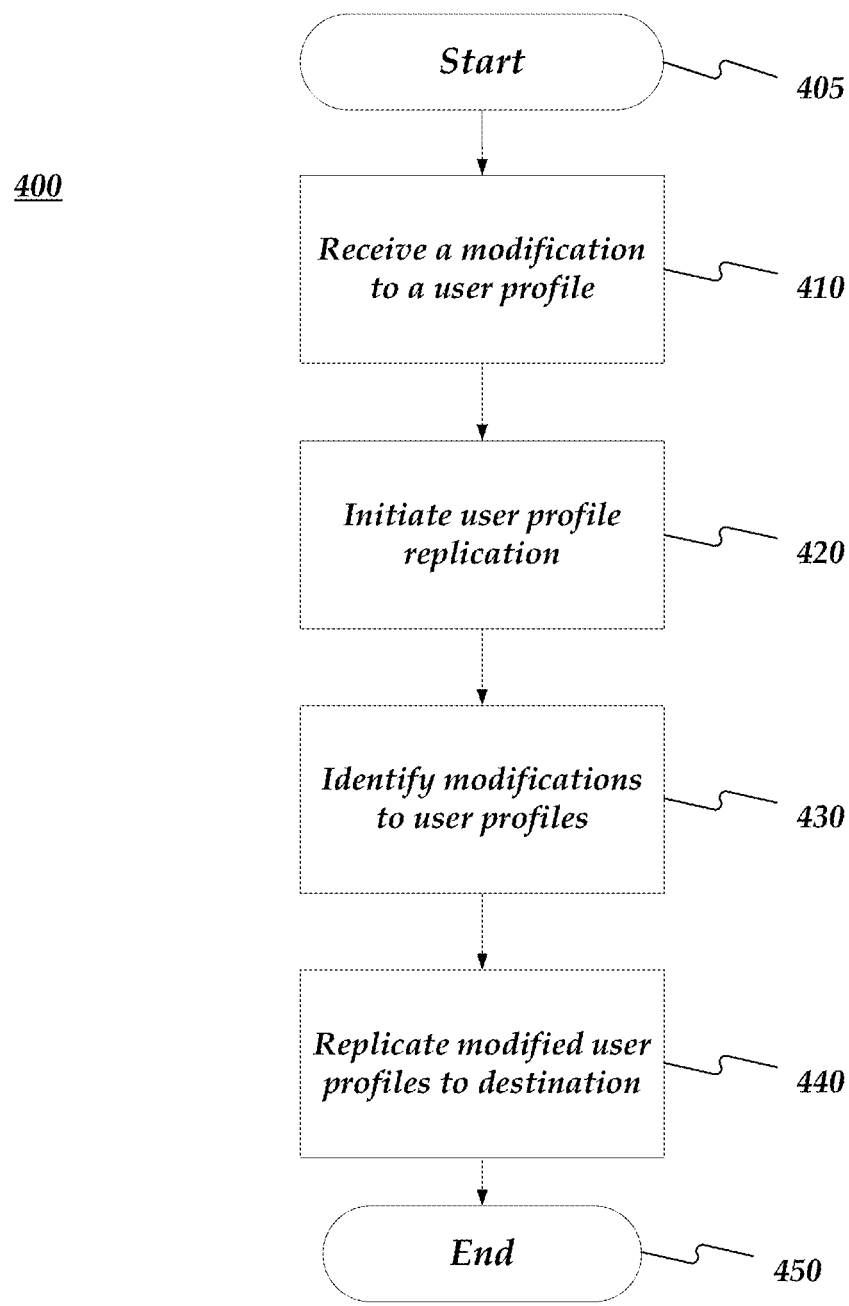
FIG. 4 is a flow chart of a method for providing user profile replication.

FIG. 4 is a flow chart setting forth the general stages involved in a method 400 consistent with an embodiment of the invention for providing user profile replication. Method 400 may be implemented using a computing device 500 as described in more detail below with respect to FIG. 5. Ways to implement the stages of method 400 will be described in greater detail below. Method 400 may begin at starting block 405 and proceed to stage 410 where computing device 500 may receive at least one modification to at least one user profile property at a first service provider location. For example, a new user may create a new user profile or an existing user may update their personal profile by changing their group memberships at source shared service provider farm 110. Method 400 may cause computing device 500 to update a user profile change log in response to receiving the at least one modification to the at least one user profile property. Method 400 may also update source change token 330 to reflect the time at which the at least one modification was made. Consistent with exemplary embodiments, source SSP farm 110 may comprise a plurality of user profiles associated with providing a plurality of services to a plurality of users. Source SSP farm 110, first destination SSP farm 120, and second destination SSP farm 130 may thus provide consistently customized services to users based on the replicated user profiles.

From stage 410, where computing device 500 received the at least one modification to the at least one user profile property, method 400 may advance to stage 420 where computing device 500 may initiate a user profile replication. User profile replication may be initiated in response to receiving a request for changes from at least one destination SSP farm. Consistent with embodiments of the present invention, user profile replication may also be initiated in response to receiving the at least one modification to the at least one user profile property and/or initiated at a predetermined time interval. User profile replication may also be initiated by a user. For example, a user may create at least one new service provider such as second destination SSP farm 140 and cause source SSP farm 110 to perform a full replication of the plurality of user profiles. Source SSP farm 110 may also perform a full replication of the plurality of user profiles to a destination SSP farm that has suffered a failure as part of a disaster recovery scenario.

Method 400 may then continue to stage 430 where computing device 500 may identify modifications to user profiles stored at source SSP farm 110. For example, computing device 500 may compare source change token 330 to first current change token 310 to determine the time interval for which user profile changes should be replicated, where first current change token 310 is associated with the time for at least one prior replication to first destination SSP farm 120. Computing device 500 may then retrieve user profile changes for the time interval from the user profile change log. Consistent with embodiments of the present invention, source SSP may determine whether a modified property is restricted and should not be replicated, either because the property should remain private or because the property is not needed by other SSP farms to provide consistently customized services. Source SSP farm 110 may prevent restricted properties from being replicated.

Once computing device 500 identifies modifications to user profiles in stage 430, method 400 may continue to stage 440 where computing device 500 may replicate the identified modifications to at least one destination service provider. For example, computing device 500 may send the identified modifications to first destination SSP farm 120 via a communication connection 516. Consistent with embodiments of the present invention, first destination SSP farm 120 may receive the sent identified modifications and determine whether said identified modifications are not needed by to provide consistently customized services to the users associated with the user profiles. Such unneeded modified properties may be disregarded by first destination SSP farm 120. Once computing device 500 replicates the modifications to the at least one destination service provider in stage 440, method 400 may then end at stage 450.

Embodiments consistent with the invention may comprise a system for providing user profile replication. The system may comprise a memory storage and a processing unit coupled to the memory storage. The processing unit may be operative to receive modifications to user profiles and replicate the user profiles to other systems. The processing unit may be operative to create the plurality of user profiles at a source service provider.

Yet another embodiment consistent with the invention may comprise a system for providing user profile replication. The system may comprise a memory storage and a processing unit coupled to the memory storage. The processing unit may be operative to replicate changes to user profiles to a plurality of geographically separate shared service providers.

Figure 5:
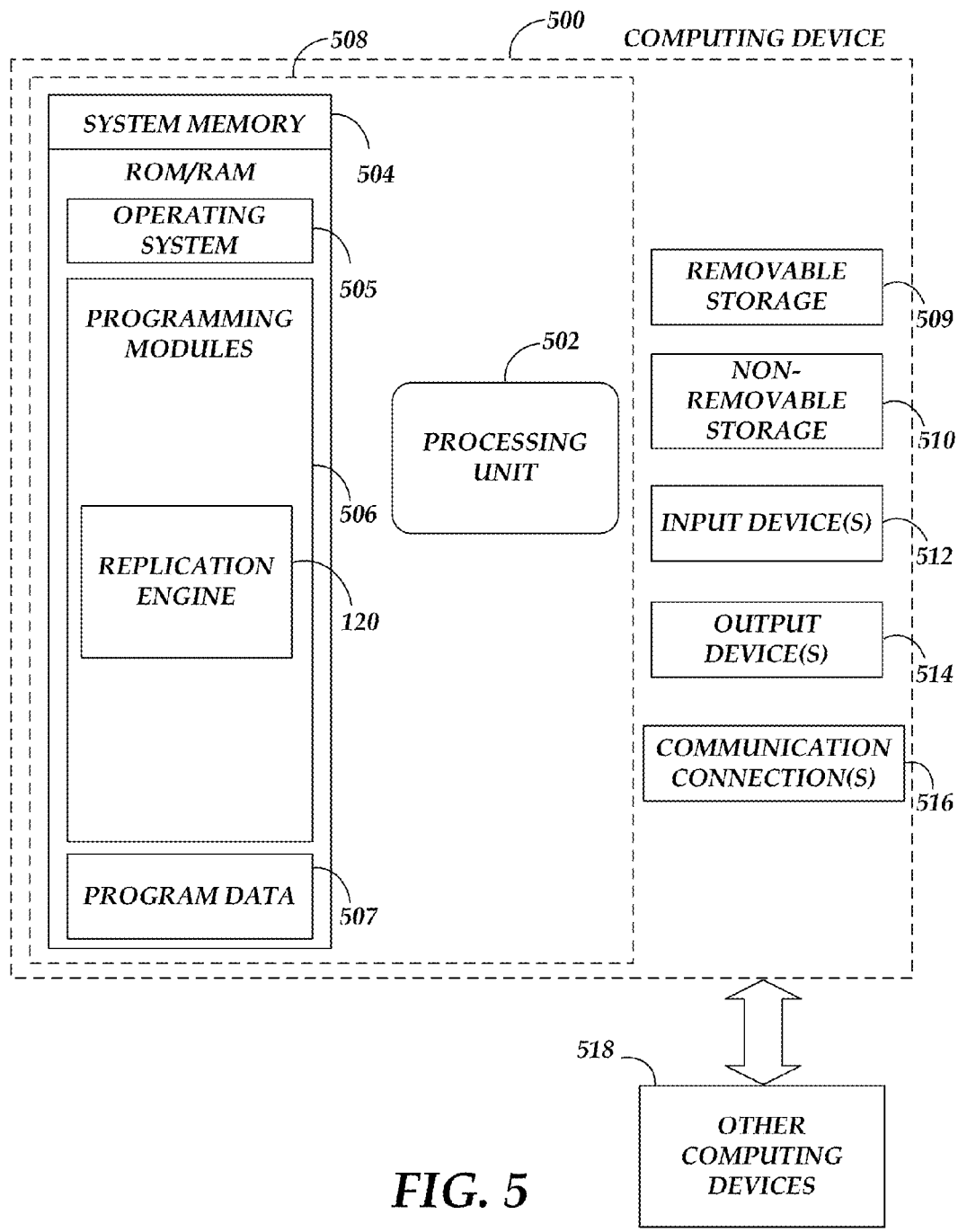
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise an operating environment for system 100 as described above. System 100 may operate in other environments and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include replication engine 120 and/or user interface 200. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g. replication engine 120) may perform processes including, for example, one or more of method 400's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing user profile replication, the method comprising:
   receiving at least one modification to at least one user profile property in a user profile, the at least one modification having occurred at a first service provider;
   updating a user profile change log in response to receiving the at least one modification to the at least one user profile property in the user profile;
   in response to updating the user profile change log, updating a source change token to indicate the time of the modification, wherein the source change token represents a location in the user profile change log of the update in response to the at least one modification in the user profile change log;
   identifying the at least one modification to the at least one user profile property in the user profile; and
   replicating, by a computing device, the identified at least one modification to the at least one user profile property at a second service provider, wherein the identified at least one modification is provided by the user profile change log, and wherein replicating the identified at least one modification comprises comparing the source change token to a current change token at the second service provider, wherein the at least one modification provided by the change log is determined by the difference in time between the source change token and the current change token.

2. The method of claim 1, wherein the first service provider and the second service provider are geographically separate.

3. The method of claim 1, further comprising wherein identifying the at least one modification to the at least one user profile property comprises retrieving the at least one modification to the at least one user profile property from the user profile change log.

4. The method of claim 1, wherein identifying the at least one modification to the at least one user profile property comprises:
   receiving a request from the second service provider for updates; and
   determining whether at least one user profile change has occurred since at least one prior request for updates from the second service provider.

5. The method of claim 1, further comprising replicating the at least one modification to the at least one user profile property to at least one third service provider.

6. The method of claim 1, further comprising:
   determining whether the at least one modification to the at least one user profile property comprises a modification to a restricted property; and
   in response to determining that the at least one modification to the at least one user profile property comprises a modification to a restricted property, preventing replication of the at least one modification to the at least one user profile property to the second service provider.

7. The method of claim 6, wherein the restricted property comprises at least one of the following: a private property and an unneeded property.

8. The method of claim 1, wherein the first service provider comprises a plurality of user profiles used to provide a plurality of customized services.

9. The method of claim 8, further comprising:
   creating at least one new service provider; and
   replicating the plurality of user profiles to the at least one new service provider.

10. The method of claim 8, further comprising, in response to a failure of the second service provider, replicating the plurality of user profiles to the second service provider.

11. The method of claim 1, further comprising:
   determining, by the second service provider, that the at least one modification to the at least one user profile property is not needed by the second service provider; and
   in response to determining that the at least one modification to the at least one user profile property is not needed by the second service provider, disregarding the at least one modification to the at least one user profile property.

12. The method of claim 1, wherein replicating the identified at least one modification to the at least one user profile property at the second service provider comprises replicating the identified at least one modification to the at least one user profile property by a replication engine in remote communication with the first service provider and the second service provider.

13. A system for providing user profile replication, the system comprising:
a memory storage; and
a processing unit coupled to the memory storage, wherein the processing unit is operative to:
create a plurality of user profiles at a first service provider;
receive at least one modification to at least one of the plurality of user profiles, the at least one modification having occurred at the first service provider;
update a change log to reflect a time and substance of the at least one modification to the at least one of the plurality of user profiles;
in response to updating the change log, updating a source change token to indicate the time of the modification, wherein the source change token represents a location in the user profile change log of the update in response to the at least one modification in the user profile change log; and
replicate the at least one modification to the at least one of the plurality of user profiles to a second service provider, wherein the at least one modification is provided by the user profile change log, and wherein replicating the identified at least one modification comprises comparing the source change token to a current change token at the second service provider, wherein the at least one modification provided by the change log is determined by the difference in time between the source change token and the current change token.

14. The system of claim 13, wherein the processing unit is further operative to:
determine whether the at least one modification to the at least one of the plurality of user profiles comprises a restricted modification; and
in response to determining that the at least one modification to the at least one of the plurality of user profiles comprises a restricted modification, prevent replication of the restricted modification to the at least one of the plurality of user profiles to the second service provider.

15. The system of claim 13, wherein the processing unit is further operative to customize services provided by the first service provider for each user associated with one of the plurality of user profiles.

16. The system of claim 15, wherein each user associated with one of the plurality of user profiles will receive the same customization of services provided by the first service provider when the user receives services from the second service provider.

17. The system of claim 13, wherein the processing unit is operative to replicate the at least one modification to the at least one of the plurality of user profiles to the second service provider in response to the processing unit having received the modification to the at least one of the plurality of user profiles.

18. The system of claim 13, wherein the processing unit is operative to replicate the at least one modification to the at least one of the plurality of user profiles to the second service provider at a configurable time interval.

19. The system of claim 13, wherein the processing unit is operative to replicate the at least one modification to the at least one of the plurality of user profiles to the second service provider in response to receiving a request for changes from the second service provider.

20. A computer-readable storage medium, not consisting of a propagating data signal, which stores a set of instructions which when executed performs a method for providing user profile replication, the method executed by the set of instructions comprising:
creating a plurality of user profiles at a first service provider;
replicating the plurality of user profiles to at least one second service provider, wherein the first service provider and the at least one second service provider provide services to a plurality of users at geographically separate locations;
receiving at least one change to at least one of the plurality of user profiles, the at least one change having occurred at the first service provider;
updating a user profile change log in response to receiving the at least one change to the at least one of the plurality of user profiles;
in response to updating the user profile change log, updating a source change token to indicate the time of the modification, wherein the source change token represents a location in the user profile change log of the update in response to the at least one modification in the user profile change log;
receiving a request for changes from the at least one second service provider;
determining whether at least one prior request for changes has been received from the at least one second service provider; and
in response to determining that the at least one prior request for changes has been received from the at least one second service provider, comparing the source change token to a current change token at the at least one second service provider to identify which changes recorded in the user profile change log to send to the second service provider; and
sending the identified changes in the user provide change log to the at least one second service provider.

* * * * *